Feb. 26, 1924.

A. L. SCHRAM 1,484,907

METHOD OF AND APPARATUS FOR FEEDING MOLTEN GLASS INTO MOLDS

Filed Feb. 10, 1921     6 Sheets-Sheet 5

Fig.11

INVENTOR
ALEXANDER L. SCHRAM
BY Edward E. Longan
ATTY.

Patented Feb. 26, 1924.

1,484,907

UNITED STATES PATENT OFFICE.

ALEXANDER L. SCHRAM, OF HILLSBORO, ILLINOIS, ASSIGNOR TO SCHRAM GLASS MANUFACTURING COMPANY, OF ST. LOUIS, MISSOURI, A CORPORATION OF MISSOURI.

METHOD OF AND APPARATUS FOR FEEDING MOLTEN GLASS INTO MOLDS.

Application filed February 10, 1921. Serial No. 443,814.

*To all whom it may concern:*

Be it known that I, ALEXANDER L. SCHRAM, a citizen of the United States, and resident of the city of Hillsboro, county of Montgomery and State of Illinois, have invented certain new and useful Improvements in the Methods of and Apparatus for Feeding Molten Glass into Molds, of which the following is a specification containing a full, clear, and exact description, reference being had to the accompanying drawings, forming a part hereof.

This invention relates to improvements in the method of and apparatus for feeding molten glass into molds and has for its primary object the feeding of a predetermined quantity and shaped mass of glass into molds from a gathering cup having a movable bottom.

A further object is to construct an apparatus having a tapered gathering cup with a movable bottom and a severing knife located above the gathering cup, the severing knife and movable bottom operating in opposite directions simultaneously, and the gathering cup opening at predetermined intervals so as to discharge its contents into a mold,—the movement of the gathering cup and of the knife and bottom being synchronized with the movement of the mold table.

A further object is to construct an apparatus having a partable gathering cup which has a movable bottom and a severing knife located above the cup, the severing knife adapted to close the cup and the movable bottom being withdrawn simultaneously with the movement of the severing knife and the cup being operated after this movement of the severing knife and bottom has taken place.

A further object is to construct an apparatus for feeding molten glass into molds which has a partable cup, a movable bottom and a severing knife located above the cup,— the movable bottom being so arranged that the gathering mass of glass will contact with it only a short time before the mass is discharged from the cup. The purpose of this movable bottom being to prevent the chilling of the lower end of the mass of glass through exposure to the atmosphere and at the same time to arrest the movement of the gathering mass of glass in the cup for a short period of time, thus allowing it to more readily absorb the sheared end of the mass and thus prevent the formation of scars in the finished article.

A still further object is the gathering or accumulation of a sufficient quantity of glass to make the desired article in a partable cup, one end of which is always closed during the period of accumulation within the cup and both ends of which are alternately closed during the period of accumulation within the cup in the discharge of the gathered mass from the cup.

A still further object is the gathering or accumulation of a sufficient quantity of glass to make the desired article in a partable cup, the bottom of the cup being closed during the period of accumulation and the top of the cup closed during the period of discharge.

A still further object is to gather in a partable cup a sufficient amount of glass to make the desired article, which mass of glass, during its accumulation, is supported both on its sides by the walls of the cup and on its bottom by the movable bottom of the cup and severing the on-coming stream of glass above the accumulated mass of glass within the cup.

A still further object is to segregate from a continuously flowing stream of glass a sufficient quantity to make the desired article and utilizing the enlarged end of the stream as a moving plastic support during a portion of the accumulation period and utilizing a physical movable support during the remainder of the period of accumulation and discharging the accumulated mass at intervals into the molds of a forming machine.

Figure 1:
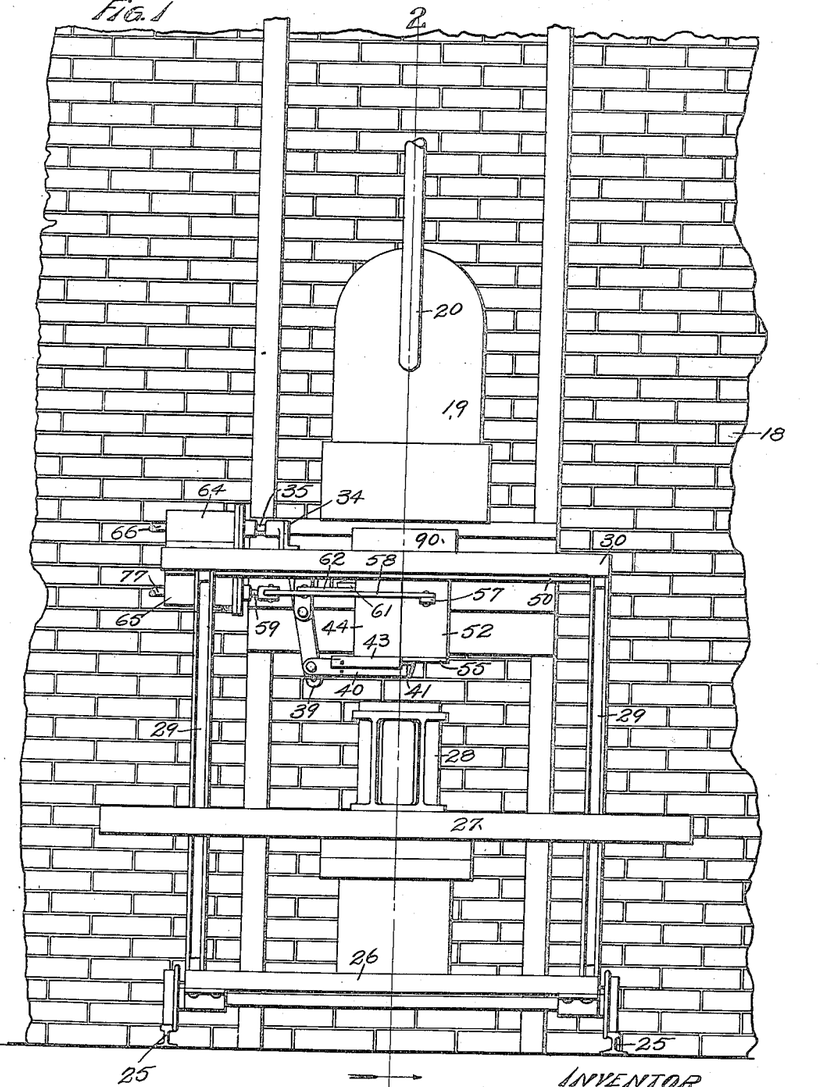
Fig. 1 is a front elevation of a portion of the glass front with my apparatus in position.
Figure 2:
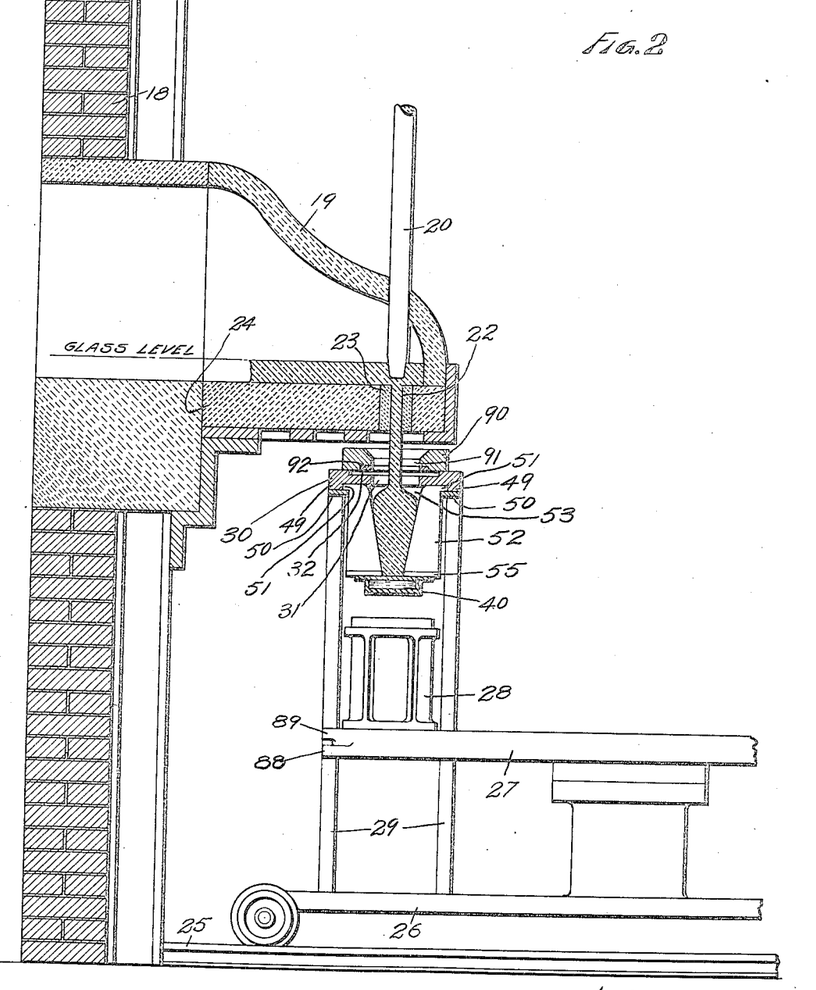
Fig. 2 is a vertical sectional view taken on the line 2—2 of Fig. 1.
Figure 3:
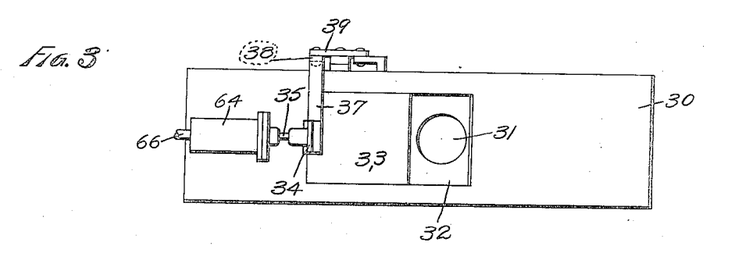
Fig. 3 is a top plan view of the supporting plate with the scraper plate removed showing the position of the severing knife.
Figure 4:
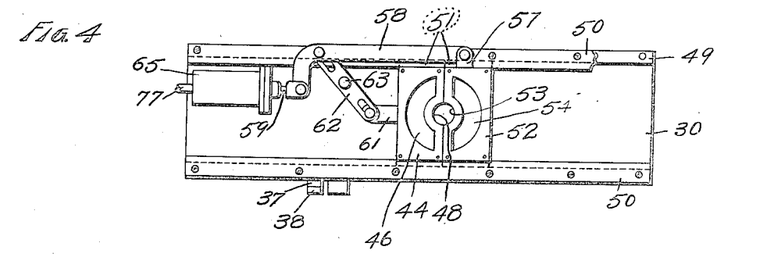
Fig. 4 is a bottom plan view of the supporting plate showing the partable measuring cup with its bottom removed and the mechanism by which the cup is operated.
Figure 5:
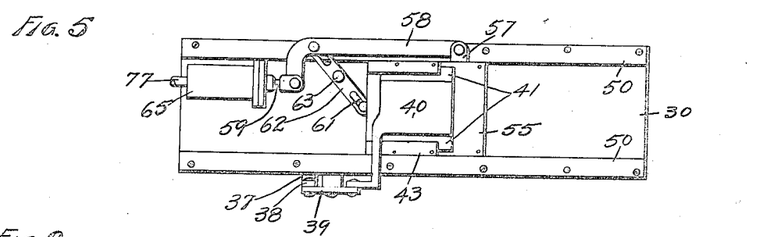
Fig. 5 is a similar view showing the bottom of the measuring cup in position.
Figure 6:
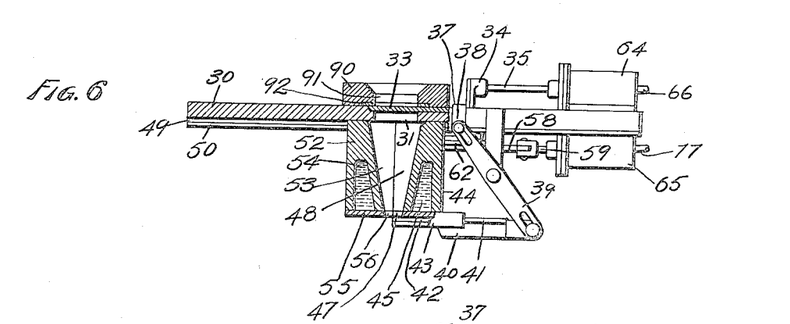
Fig. 6 is a side elevation of the supporting plate and gathering cup with portions in section showing the severing knife in closed position and the bottom withdrawn or in open position.
Figure 7:
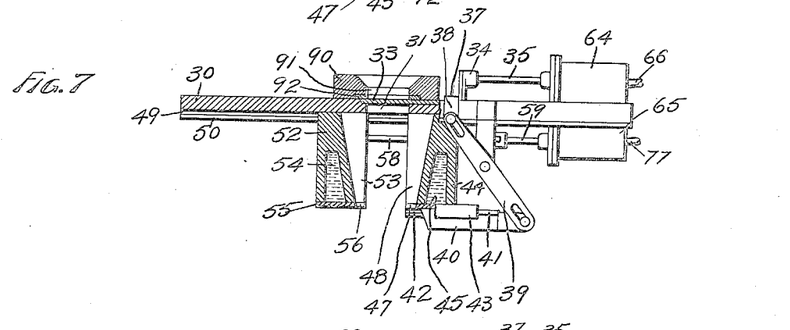
Fig. 7 is a similar view showing the measuring cup parted.
Figure 11:
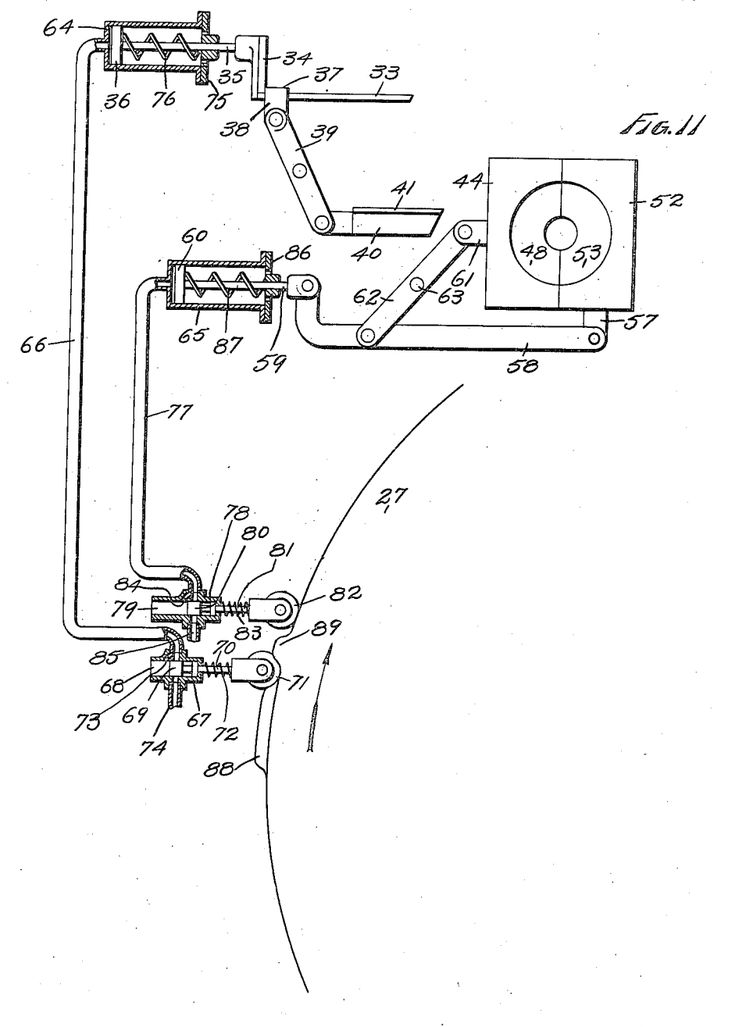
Fig. 11 is a diagrammatic view of the gathering cup and the severing knife and movable cup bottom showing the manner of operating and synchronizing with the movement of the mold table.

In the construction of my device I employ a glass furnace 18, which is of the usual construction and which is provided with a boot 19—the boot 19 is secured to the furnace in any well known manner. This boot is provided with a valve 20 which regulates the flow of glass through the opening 22 formed in the sleeve 23. This sleeve is secured in the bottom 24 of the boot 19. Secured to the floor of the factory are rails 25 on which a carriage 26 is mounted. This carriage supports the mold table 27, on the upper surface of which are secured molds 28. This table is arranged to rotate intermittently and its movement so arranged that the molds 28 will be brought directly beneath the opening 22 formed in the sleeve 23. Secured to the carriage 26 are uprights or legs 29, to the upper end of which is secured a supporting plate 30. This supporting plate is provided with an opening 31, which opening is below and concentric with the opening 22. The upper face of the plate 30 is provided with a recess 32 in which the severing knife 33 is slidably mounted. This severing knife has secured to it a bracket 34, which bracket is in turn secured to one end of the piston rod 35—the other end of the rod being secured to the piston 36. Formed integral with the bracket 34 is an extension 37. This extension projects over one side of the plate 31 and is provided with a depending ear 38, to which one end of the lever 39 is pivoted. The opposite end of the lever is pivoted to the movable bottom 40. This bottom is provided on two of its sides with projections 41, which fit into grooves 42 formed in the plate 43. This plate is secured to the cup member 44 and is for the purpose of closing the water jacket 45 formed therein. The plate 43 is provided with a central semi-circular opening 46, which is so shaped as to form a continuation of the tapered semi-circular face 48 of the cup member 44. The underside of the plate 30 is provided along two of its edges with ribs 49, and secured to these ribs are gibs 50, which with the plate form a slide for the tongues 51 formed on the cup members 44 and 52. The cup member 52 is provided with a semi-circular face 53, which when placed in conjunction with the face 48 of the cup member 44 will form an upwardly flaring circular opening. The cup member 52 is provided with the water jacket 54, which is closed by means of the plate 55. This plate is also provided with a semi-circular opening 56, which forms a continuation of the wall or surface 53. Secured to the supporting plate 30 is a downwardly projecting bracket 56 to which the lever 39 is pivoted. The purpose of the lever 39 is to move the severing knife 33 and the movable bottom 40 in opposite directions simultaneously. Secured to one side of the cup member 52 is a projecting ear 57 to which is pivotally secured the lever 58. This lever has its opposite end connected to the piston rod 59,—the piston rod 59 being in turn connected to the piston 60. The cup member 44 is provided with the projecting ear 61 to which one end of the lever 62 is secured, its opposite end being secured to the lever 58. The lever 62 is pivoted to the plate 30 at its center 63. This will move the cup members 44 and 52 in opposite directions simultaneously. The pistons 56 and 60 are mounted in air cylinders 64 and 65. Connected to one end of the cylinder 64 is an air pipe 66 and secured to this pipe is a valve housing 67. This valve housing is provided with the bore 68 in which the plunger valve 69 is located. The plunger valve has secured to it the valve stem 70 and to the free end of the valve 70 is secured the roller 71. The valve stem 70 is surrounded by a coil spring 72, the purpose of which is to force the roller 71 away from the housing 67 and keep it contact with the periphery of the mold table 27. The housing 67 is also provided with a by-pass 73. This by-pass is so arranged that when the plunger valve 69 is moved backward the by-pass will be closed, while the pipe 66 will be opened so that air can pass therethrough and into the cylinder 64 from the pipe 74 which is connected to a suitable source of supply. Interposed between the piston head 36 and the cylinder head 75 is a coil spring 76, the purpose of this being to return the piston head 36 to the position shown in Fig. 11 when the by-pass 73 is uncovered. Secured to the cylinder 65 is an air pipe 77, which is connected to the valve housing 78. This valve housing is provided with an opening or bore 79 in which the plunger valve 80 is located. This plunger valve is provided with the valve stem 81, to the free end of which is secured the roller 82, and surrounding the valve stem 81 is a coil spring 83. The purpose of which is to keep the roller 82 in contact with the periphery of the mold table 27. The valve housing 78 is provided with a by-pass 84. This by-pass operating in the same manner as the by-pass 73. Secured to the housing 78 is the pipe 85, which leads to a suitable source of air pressure. Interposed between the piston 60 and the cylinder head 86 is a coil spring 87—this coil spring serving the same purpose as the coil spring 76. Formed on the periphery of the mold table 27 are projections 88 and 89. These projections are arranged in different vertical planes, (see Fig. 2) and are for the purpose of operating the valves for the admission of air into the cylinders 64 and 65, the roller 82 contacting with the projection 89 and the roller 71 with the projection 88. As will be seen from Fig. 11, the roller 71 will contact with the projection 88 first; that is, move the severing knife and movable bottom before the roller 82 will contact with the projection 89 and open the cup members; and again, the projection 88 being longer will hold the severing knife in closed position and bottom in open position for a longer period of time than the projection 89 will cause the cup members to remain open; thus it will be seen that the cup members are separated after the knife and bottom have been operated and brought together again before the knife and bottom are brought to their original positions. Secured on the upper surface of the supporting plate 30 is a scraper plate 90. This scraper plate is provided with an opening 91, which is concentric with the opening 31. The scraper plate is provided with a perforated plate 92. This plate is of hardened material and is countersunk in the bottom of the scraper plate 90. The perforation in the plate 92 is concentric with the opening 91. This plate is so arranged and located on the supporting plate 30 as to fit snugly on the severing knife 33 and is for the purpose of directing the on-coming stream of glass into the gathering cup; in other words, to prevent the on-coming stream of glass following the knife when it is withdrawn from its cutting position. Were this scraper plate not present the tendency of the on-coming stream would be to follow the severing knife and cause an accumulation and waste of glass besides making it necessary to have an operator to remove the glass from the severing knife 33 and also from the knife recess 32, as the stream of glass will overflow the knife 33 and get into the recess 32 before finally finding the opening 31.

Figure 8:
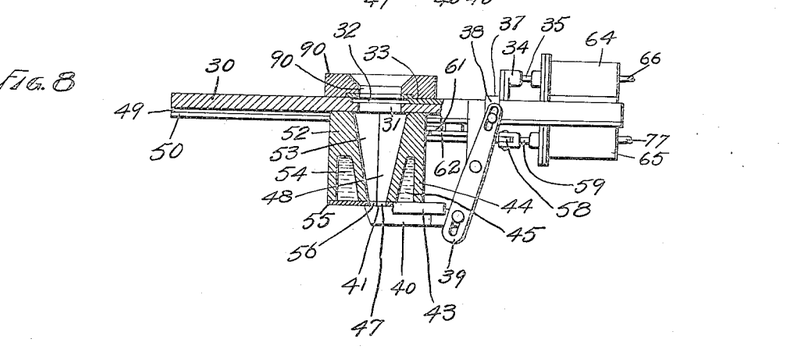
Fig. 8 is a similar view showing the cup in gathering position.
Figures 9, 10:
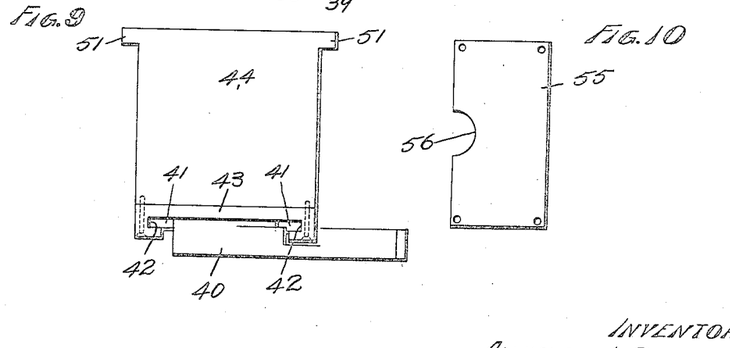
Fig. 9 is an end elevation of the gathering cup showing the movable bottom in position and the manner in which it is slidably secured to one of the cup members.
Fig. 10 is a plan view of the plate made use of for closing the water jacket of the other gathering cup member.
Figure 12:
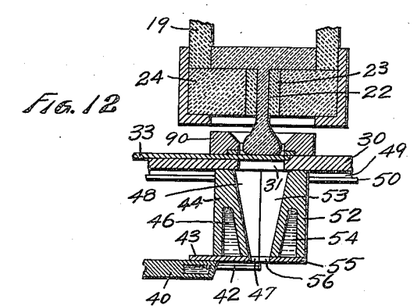
Figs. 12, 13, 14, 15, 16 and 17 are sectional views illustrating the various positions assumed by the apparatus and the various forms assumed by the glass while being gathered and discharged into the mold.
Figure 13:
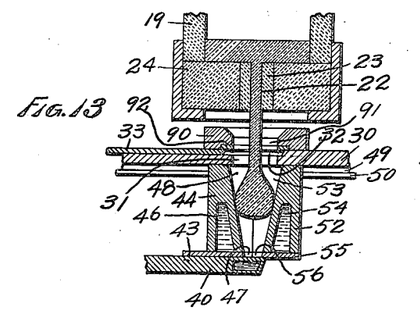
Figure 14:
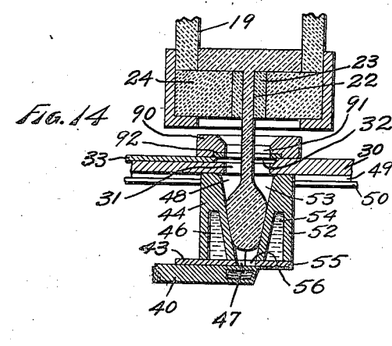
Figure 15:
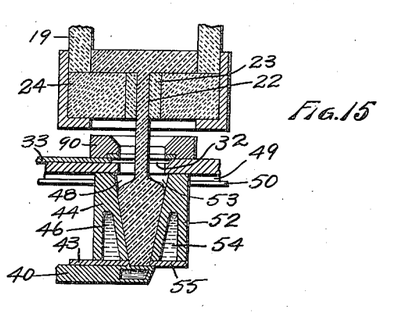
Figure 16:
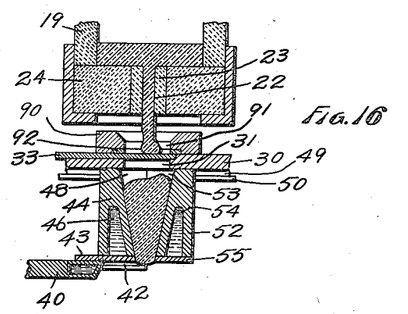
Figure 17:
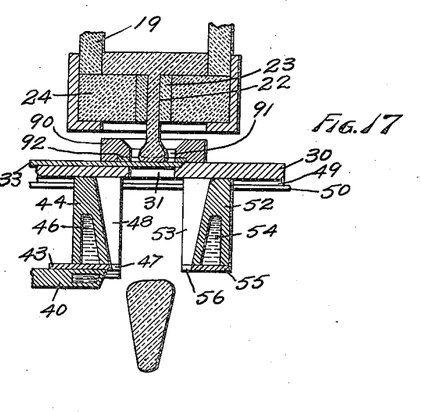

The operation of my device is as follows: When the gathering cup members, the severing knife and the bottom are in the position shown in Fig. 8, the valve 20 is regulated so that the desired stream of glass will be obtained. This stream of glass will flow into the cup and come to rest on the bottom 40. After a sufficient amount of glass has been thus gathered in the cup, the mold table 27 is placed in operation. This placing of the mold table in operation will cause it to rotate intermittently; that is, to rotate only a fraction of a revolution and come to rest when one of the molds is directly beneath the opening 22. Just before the mold table comes to rest the roller 71 rides up on the projection 88. This forces the severing knife 33 forward and at the same time withdraws the bottom 40,—this position is clearly shown in Fig. 12. Just at the moment that the mold table comes to rest the roller 82 has reached the upper-most portion of the projection 89. This admits air into the cylinder 65 and forces the cup members apart, allowing the accumulated mass to drop into the mold directly beneath it. The table commences again to rotate or revolve allowing the roller 82 to ride downward from the projection 89. This opens the by-pass 84 and allows the spring 87 to force the piston 60 backward, thus closing the gathering cup. During this opening and closing of the gathering cup the knife and bottom have remained in the position shown in Fig. 12 and the on-coming glass had its end enlarged, as illustrated in Fig. 12. The continued rotation of the mold table will allow the roller 71 to ride downward from the projection 88 and thus open the by-pass 73, allowing the piston 36 to be forced backward and withdraw the knife and push the bottom forward as illustrated in Fig. 13. The enlarged end of the stream of glass now descends into the cup, as illustrated in Fig. 13, and forms a moving plastic bottom for the on-coming glass. This bottom will gradually travel downward until it reaches the movable bottom when it comes to rest, as in Fig. 15. The on-coming glass continues to descend into the cup and on top of this arrested mass until another projection 88 comes in contact with the roller 71 when the position of the knife and bottom is as illustrated in Fig. 16. At this period the accumulated mass will commence to project slightly from the bottom of the gathering cup, as in Fig. 16, and almost immediately after this slight projection of the mass through the bottom takes place, the cup members are separated, as in Fig. 17, and the entire accumulated mass discharged from the gathering cup. The period between the time that the mass is severed from the on-coming stream and the time that it is discharged from the gathering cup is only sufficient to allow the severed end of the stream to be partially absorbed by the accumulated mass so that scars in the completed article will be eliminated, but this period of holding the glass suspended only by the sides within the gathering cup is not sufficiently long to allow the glass which protrudes from the gathering cup to become chilled to any perceptible degree by contact with the atmosphere. Thus it will be seen that by my apparatus and method I have both a plastic moving bottom for the on-coming glass for a portion of its accumulation and a movable physical support for the mass during the balance of its accumulation.

It is to be understood, of course, that the number of projections 88 and 89 must correspond with the number of molds located on the mold table and be so positioned as to operate the severing knife, bottom and cup members during the period when the mold is underneath the cup and in alignment with the opening 22.

It will be further noted that my partable gathering cup at all times has a fixed vertical axis, and remains stationary during the gathering of the glass and discharge of the gathering batch, except the opening and closing of the cup members.

Having fully described my invention, what I claim is:

1. In an apparatus for gathering glass from a continuously flowing stream, a partable gathering cup having a fixed vertical axis, a horizontally movable bottom for said cup, and a shearing member operable above said cup.

2. In an apparatus for gathering glass from a continuously flowing stream, a partable gathering cup having a fixed vertical axis, a shearing member operable in a horizontal direction above said partable gathering cup, means for operating the shearing member synchronously with the movement of a mold table, a separate means for operating the partable gathering cup synchronously with the movement of the mold table, a bottom for said partable cup, and means for moving said bottom simultaneously with the movement of the shearing member.

3. In an apparatus for gathering glass from a continuously flowing stream, a gathering cup having a fixed vertical axis and composed of partable members, a single movable shearing member operable above said partable members, means for operating the shearing member synchronously with the movement of the mold table, a separate means for operating the partable members synchronously with the movement of the mold table, said shearing member adapted to be held stationary momentarily during the movement of the partable members, a horizontally moving bottom for said gathering cup, and means for operating the bottom simultaneously with and in the opposite direction to the movement of the shearing member.

4. In an apparatus for gathering glass from a continuously flowing stream, a gathering cup having a fixed vertical axis and composed of partable members which when closed form the gathering chamber, having upwardly divergent walls, a shearing member operable above said partable members, a horizontally moving bottom for said gathering cup, means for moving the shearing member and bottom in opposite directions simultaneously, and means for opening the partable members after the shearing member has made its forward stroke and after the bottom has made its rearward stroke and closing the same before the shearing member and bottom have returned to their original position.

5. In an apparatus for gathering glass from a continuously flowing stream, a gathering cup having a fixed vertical axis and composed of partable members provided with complementary recesses which form when the members are closed a uniformly tapered opening having upwardly and outwardly diverging walls, the diameter of said opening being less at its lower end than at its upper end, a shearing member operable horizontally at the end of the cup where the opening has the greatest diameter, a bottom operable horizontally at the end of the cup where the opening has the least diameter, means for operating the shearing member and bottom simultaneously in opposite directions, and means for opening and closing the partable members after the shearing member has completed its forward and before its return stroke, the operation of said shearing member, partable members and bottom being synchronized with the movement of the mold table.

6. The method of gathering glass from a flowing stream, comprising the establishment of a continuously flowing regulated stream of glass, simultaneously severing and enlarging said stream below its outlet, utilizing the enlarged severed end of the stream as a moving plastic support for the on-coming stream of glass and a portion of the accumulated mass, bodily momentarily arresting by a physical support the movement of the complete accumulated mass, severing the stream above the completely accumulated mass and withdrawing the physical support simultaneously with the severing operation, and lastly discharging the accumulated mass directly into a mold without imparting lateral movement thereto.

7. The method of gathering glass from a flowing stream, which consists in establishing regulated flowing stream of glass, simultaneously severing and enlarging the stream below its outlet at intervals, utilizing the enlarged severed end of the stream as a moving plastic support for the on-coming stream of glass and a portion of the gathered mass, bodily arresting the downward movement of the accumulated mass until a sufficient quantity to make the desired article has been accumulated, simultaneously releasing the accumulated mass on its bottom and shearing the stream above the accumulated mass, and lastly releasing the accumulated mass on its sides and directly dropping the same into a mold without any lateral movement being imparted thereto.

8. The method of gathering glass from a flowing stream, which consists in establishing a regulated flowing stream of glass, simultaneously severing and enlarging the stream below the outlet at intervals, utilizing the enlarged severed end of the stream as a moving plastic support for the on-coming stream of glass and a portion of the gathered mass, bodily arresting the downward movement of the accumulated mass until a sufficient quantity to make the desired article has been accumulated, simultaneously releasing the accumulated mass on its bottom and shearing the stream above the accumulated mass, and lastly releasing the accumulated mass on its sides.

9. The method of separating molten glass into mold charges, which comprises flowing a stream of glass through an outlet in a container, enlarging the end of the stream below the outlet at intervals, utilizing the enlarged end of the stream as a moving plastic support for the on-coming stream of glass and a portion of the gathered mass, bodily arresting the downward movement of the accumulated mass until a sufficient quantity to make the desired article has been accumulated, simultaneously severing the stream above the accumulated mass and releasing the accumulated mass on its bottom, and thereafter releasing the accumulated mass on its sides.

In testimony whereof, I have signed my name to this specification.

ALEXANDER L. SCHRAM.